United States Patent [19]
Sato et al.

[11] Patent Number: 5,933,285
[45] Date of Patent: Aug. 3, 1999

[54] LENS BARREL

[75] Inventors: Mitsuhiro Sato, Hachioji; Tamotsu Koiwai, Akiruno; Yasuo Asakura, Hachioji, all of Japan

[73] Assignee: Olympus Optical Co., Ltd., Tokyo, Japan

[21] Appl. No.: 08/834,758

[22] Filed: Apr. 3, 1997

[30]     Foreign Application Priority Data

Apr. 17, 1996  [JP]   Japan ................................. 8-095532

[51] Int. Cl.$^6$ .............................................. G02B 15/14
[52] U.S. Cl. ......................................... 359/694; 359/822
[58] Field of Search ................................ 359/694, 819, 359/822, 826

[56]               References Cited

FOREIGN PATENT DOCUMENTS

| | | |
|---|---|---|
| 56-77809 | 6/1981 | Japan . |
| 63-160520 | 10/1988 | Japan . |
| 2-5714 | 1/1990 | Japan . |
| 7-38892 | 9/1995 | Japan . |

*Primary Examiner*—Georgia Y. Epps
*Assistant Examiner*—Dawn-Marie Bey
*Attorney, Agent, or Firm*—Louis Weinstein

[57]                ABSTRACT

A lens barrel with a stationary frame fixed relative to a camera body; a flare diaphragm movable in a direction of an optical axis for cutting off harmful incident light; an urging spring urging the flare diaphragm in the direction of the optical axis; a third group frame including a protruding portion which is driven into abutting contact with the flare diaphragm to restrict a position of the flare diaphragm in the direction of the optical axis, the third group frame being moved in the direction of the optical axis; and, a supporting shaft rigidly positioned on the stationary frame. The supporting shaft guides the movable flare diaphragm in the direction of the optical axis, while being snugly fitted to the flare diaphragm. In addition, the supporting shaft includes a stepped front portion for restricting such movement of the flare diaphragm to a predetermined position.

16 Claims, 9 Drawing Sheets

LENS BARREL

BACKGROUND OF THE INVENTION

1. Field of the Invention

This invention relates to a lens barrel, and more particularly, to a lens barrel having a flare diaphragm member disposed therein for cutting off harmful incident light.

2. Related Art Statement

In the past, various proposals have been made to provide a lens barrel having a flare diaphragm member provided therein for cutting off harmful incident light.

One such example of a lens barrel is shown in Japanese Utility Model Application Laid-Open No. (Sho)63-160520. More specifically, this application describes an inner surface reflection-proof device for a zoom lens having at least two groups or front and rear groups of movable lenses moved in a direction of an optical axis thereof so as to provide zooming. In the zoom lens, there is provided a reflection-proof member such as a flare stop or diaphragm for blocking harmful light rays which would otherwise reach the surface of loaded film. The reflection-proof member is positioned behind the rear lens group so as to be movable in the direction of the optical axis. The reflection-proof member is moved to a predetermined position in response to movement of the rear lens group. Further, when a cam ring to be driven into rotation on the optical axis is pivoted, then the groups of movable lenses and the reflection-proof member are consequently moved together in the direction of the optical axis.

Another example is shown in Japanese Utility Model Application Laid-Open No. (Hei)2-5714. More specifically, this application contains a zoom lens barrel in which a cam ring is supported on a stationary cylinder so as to be movable in a direction of an optical axis thereof in response to rotation. Further, the cam ring has a lens-guiding ring provided thereon. The lens-guiding ring has a lens-guiding ring provided thereon. The lens-guiding ring is moved jointly with the cam ring in the direction of the optical axis, while being relatively rotated with respect to the cam ring in response to movement of the cam ring in the direction of the optical axis. The lens-guiding ring and the cam ring are respectively provided with cam grooves and lens-guiding grooves, which grooves are adapted for use with at least two groups or front and rear groups of movable lenses. These lenses are provided with guide pins which are inserted between the cam grooves and lens-guiding grooves. The cam groove and the lens-guiding groove are configured in shape to move the front and rear groups of movable lenses on a predetermined trajectory by way of a motion combined between the optical axis-along-movement and relative rotation of the cam ring and lens-guiding ring. In addition, a light-sealing plate such as a flare diaphragm for shutting off harmful light rays is provided at a rear end of the lens-guiding ring.

However, the device according to the above-described Application No. (Sho)63-160520 requires a space inside the lens barrel to extend the cam ring or to be connected to the cam ring. Such a requirement contributes to a larger-sized lens barrel.

In the zoom lens barrel according to the preceding Application No. (Hei)2-5714, a position of the light-sealing plate such as the flare diaphragm is defined by the lens-guiding ring. As a result, there are cases where the light-sealing plate such as the flare diaphragm cannot be disposed at a position which is the most effective in cutting off incident harmful light.

OBJECTS AND SUMMARY OF THE INVENTION

A first object of the present invention is to provide a lens barrel having a highly effective flare diaphragm member disposed therein.

A second object of the present invention is to provide a lens barrel having a flare diaphragm member disposed therein without the lens barrel being enlarged in dimension.

A third object of the present invention is to provide a lens barrel having a space-saving, highly effective flare diaphragm member provided therein.

A fourth object of the present invention is to provide a lens barrel for use in a camera having a photographic optical system, in which a highly effective diaphragm member is provided.

A fifth object of the present invention is to provide a lens barrel for use in a camera having a photographic optical system, in which a diaphragm member is provided without the lens barrel being enlarged in dimension.

A sixth object of the present invention is to provide a lens barrel for use in a camera having a photographic optical system, in which a space-saving, highly effective diaphragm member is disposed.

In brief, the lens barrel pursuant to the present invention includes the following: a flare diaphragm member for intercepting harmful light rays among incident light rays; a protruding portion provided on the flare diaphragm member, the protruding portion having a guide portion thereon; and, a supporting shaft snugly fitted to the guide portion. The supporting shaft guides the flare diaphragm member in a manner movable along the direction of the optical axis.

These as well as other objects and advantages of the present invention will become further apparent from the following detailed explanation.

DESCRIPTION OF THE PREFERRED EMBODIMENT

Next, an embodiment of the present invention will be described with reference to the drawings.

Figure 1A:
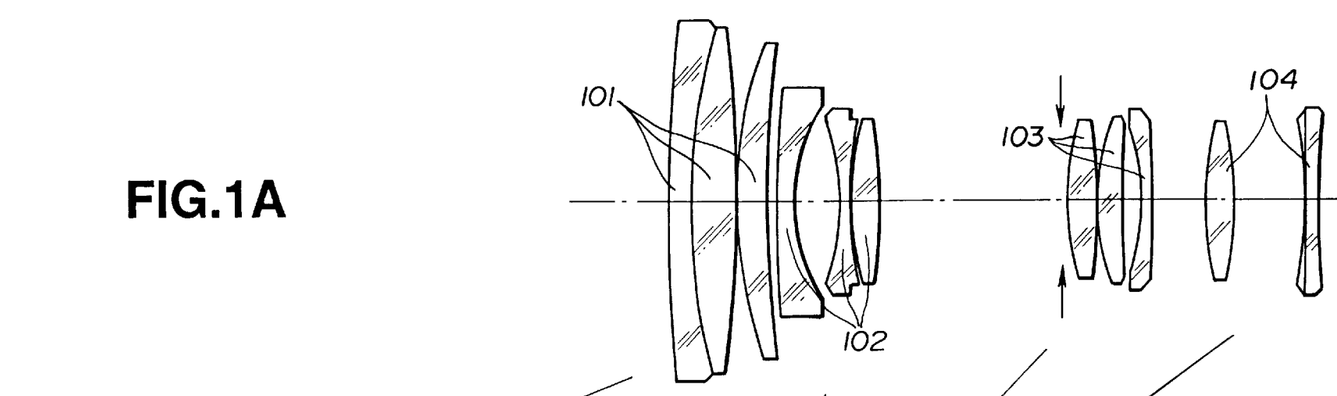
FIG. 1A is a cross-sectional view, showing how a zoom lens is structured in a lens barrel in a widened state thereof according to an embodiment of the present invention.
Figure 1B:
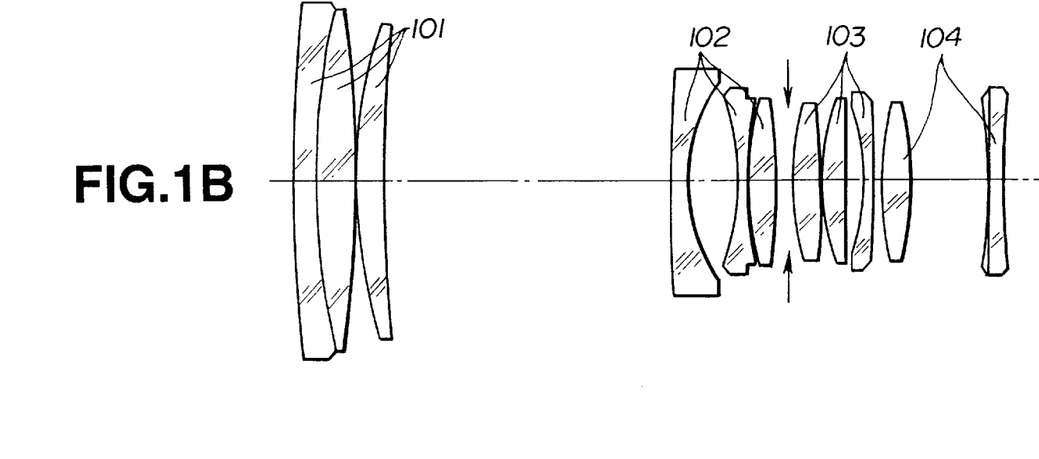
FIG. 1B is a cross-sectional view showing how the zoom lens is structured in the lens barrel in a telescoped state thereof.

FIGS. 1A, 1B and FIGS. 2–9 illustrate the embodiment. FIG. 1A is a cross-sectional view, showing how a zoom lens is structured in a lens barrel in a widened state thereof. FIG. 1B is a cross-sectional view, showing how the zoom lens is structured in the lens barrel in a telescoped state thereof.

This zoom lens includes a first lens group 101, a second lens group 102, a third lens group 103, and a fourth lens group 104. These lens groups are in turn positioned from the front side of an optical axis of the zoom lens, or from the left side in FIGS. 1A and 1B.

As shown by arrows in FIGS. 1A and 1B, the lens groups are moved to respective positions along the optical axis, thereby providing zooming from the widened state as illustrated in FIG. 1A to the telescoped state as shown in FIG. 1B. In this connection, focusing is achieved by the first and second lens groups 101 and 102 being moved jointly with one another in the direction of the optical axis.

Figure 2:
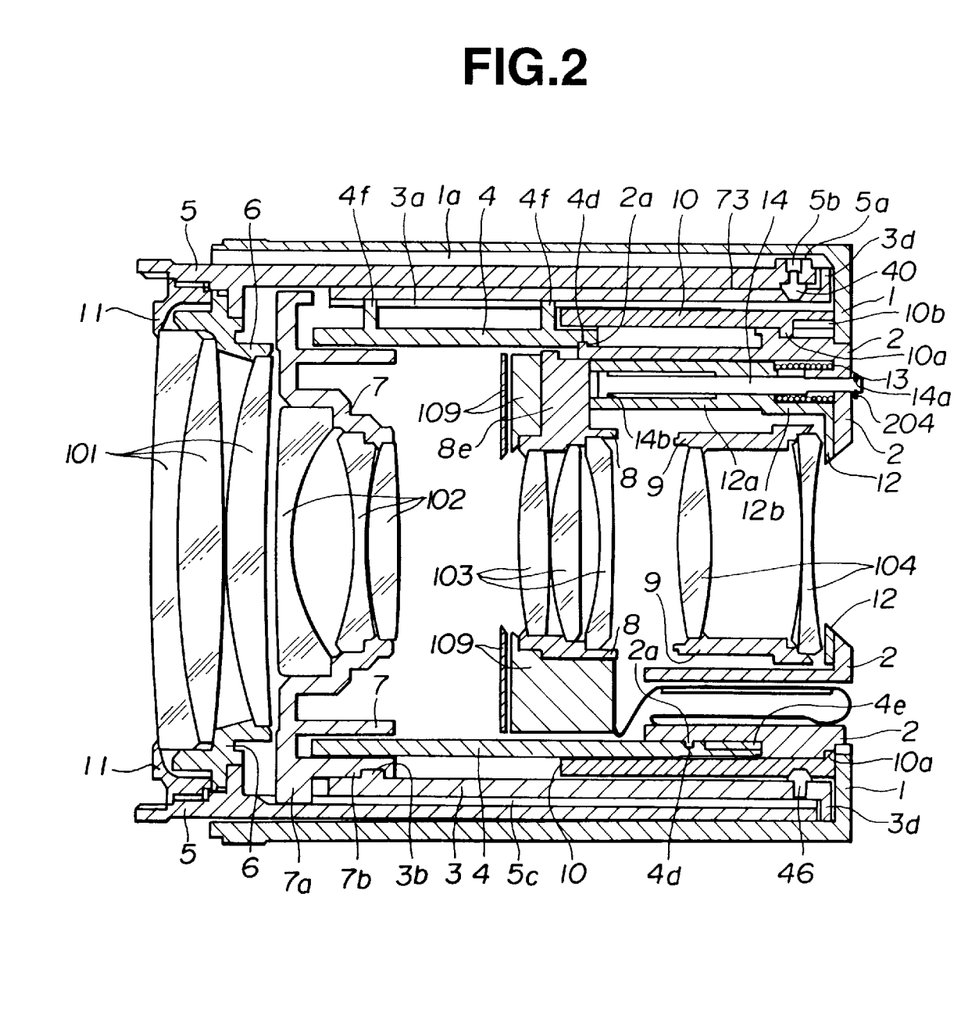
FIG. 2 is a cross-sectional view taken along an optical axis, illustrating the lens barrel in a collapsed state thereof.
Figure 3:
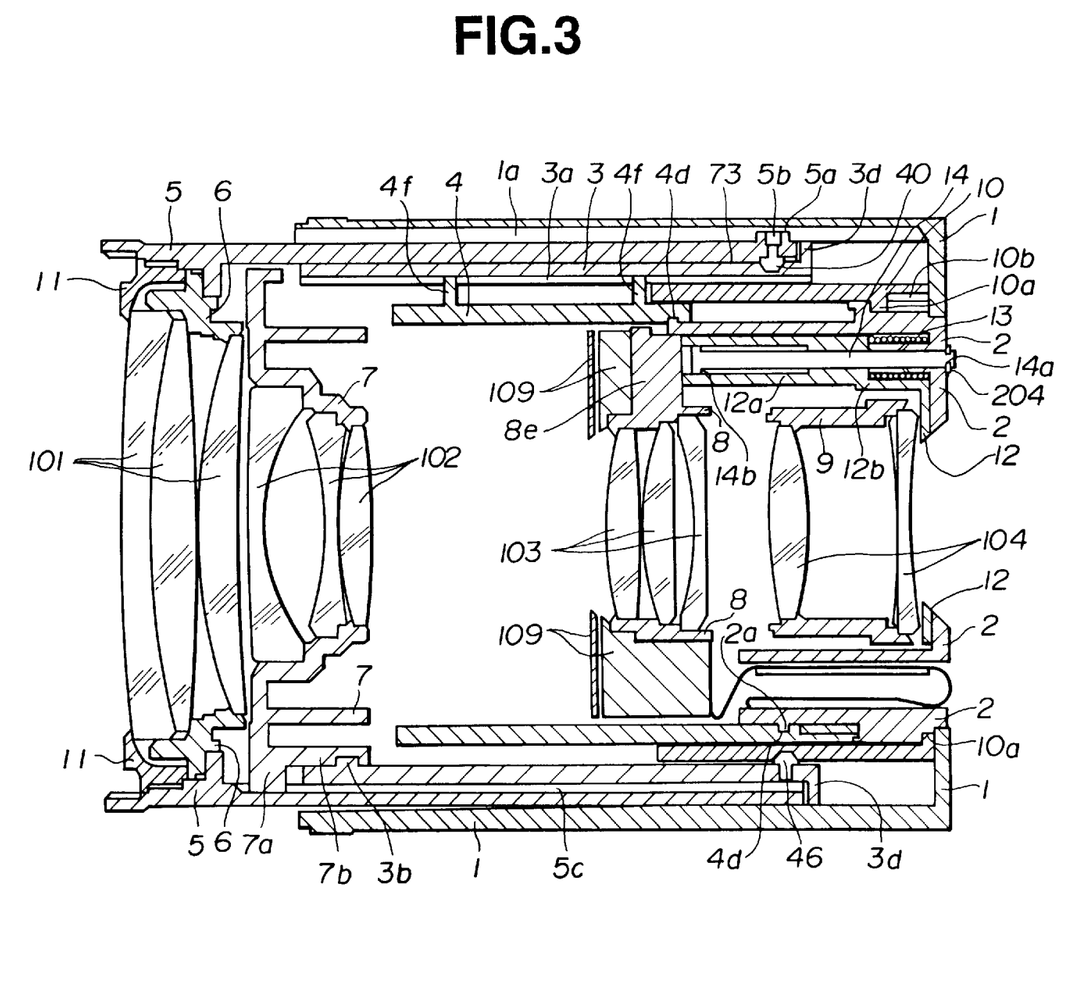
FIG. 3 is a cross-sectional view taken along the optical axis, illustrating the lens barrel in a widened state thereof.
Figure 4:
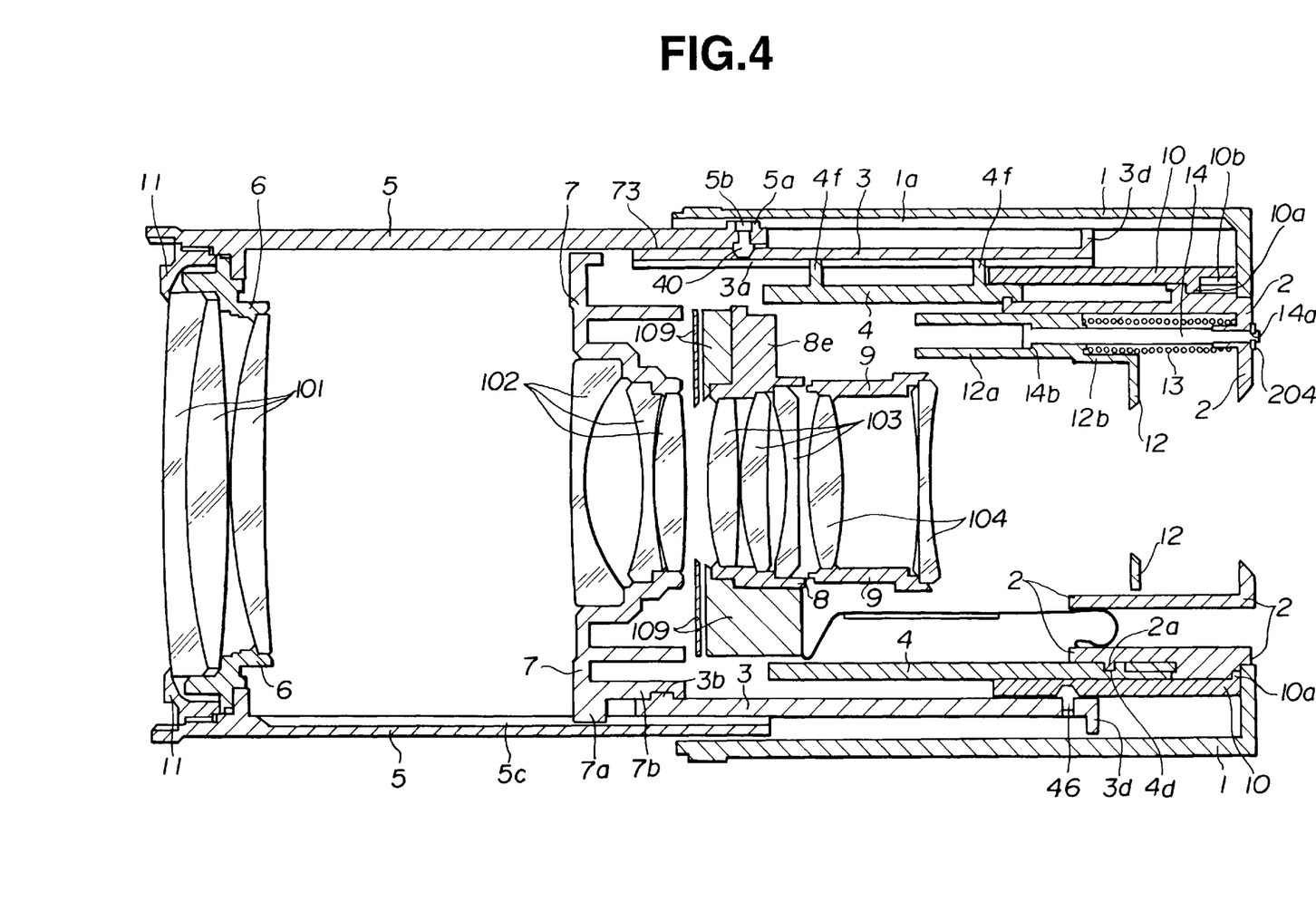
FIG. 4 is a cross-sectional view taken along the optical axis, illustrating the lens barrel in a telescoped state thereof.
Figure 5:
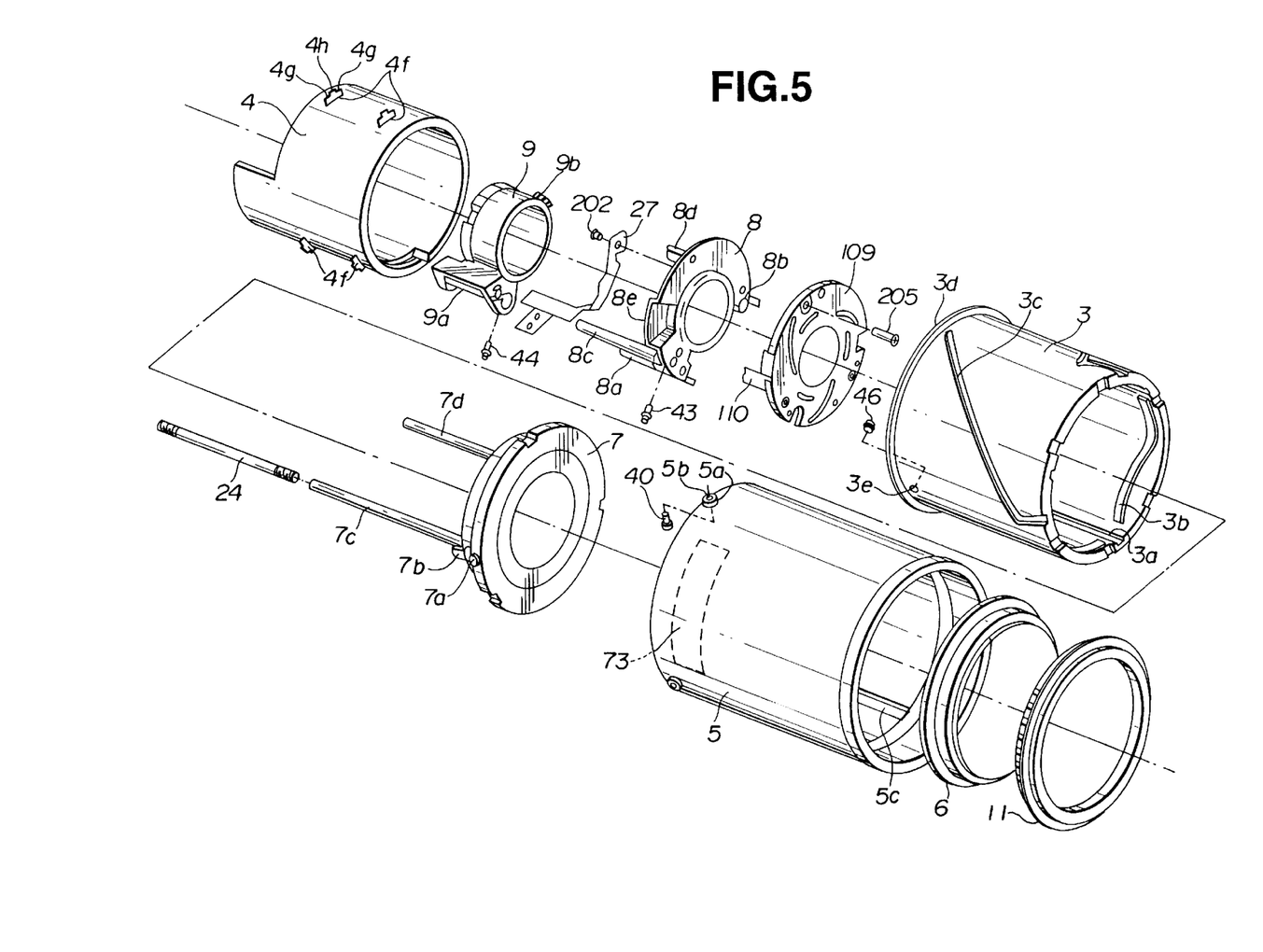
FIG. 5 is an exploded, perspective view, illustrating a portion of the lens barrel.
Figure 6:
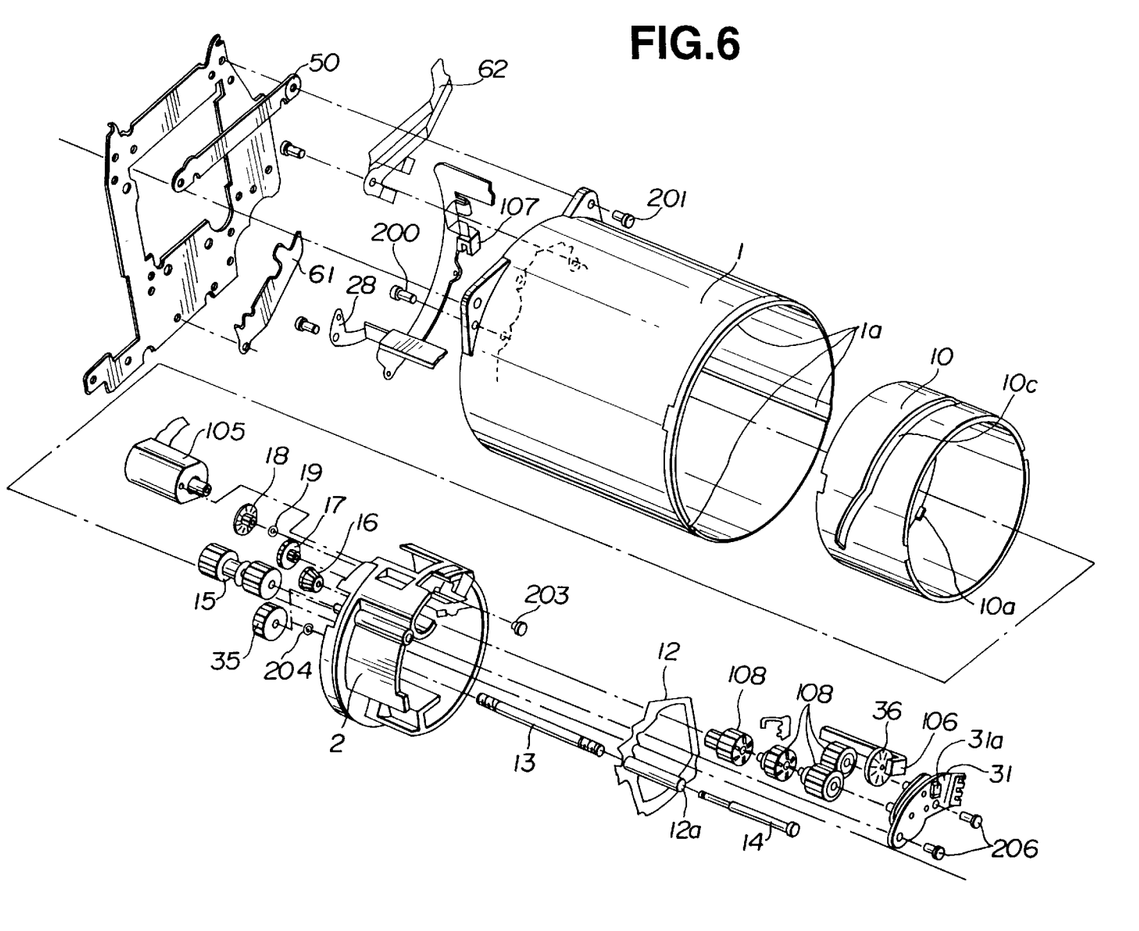
FIG. 6 is an exploded, perspective view, illustrating another portion of the lens barrel.
Figure 7:
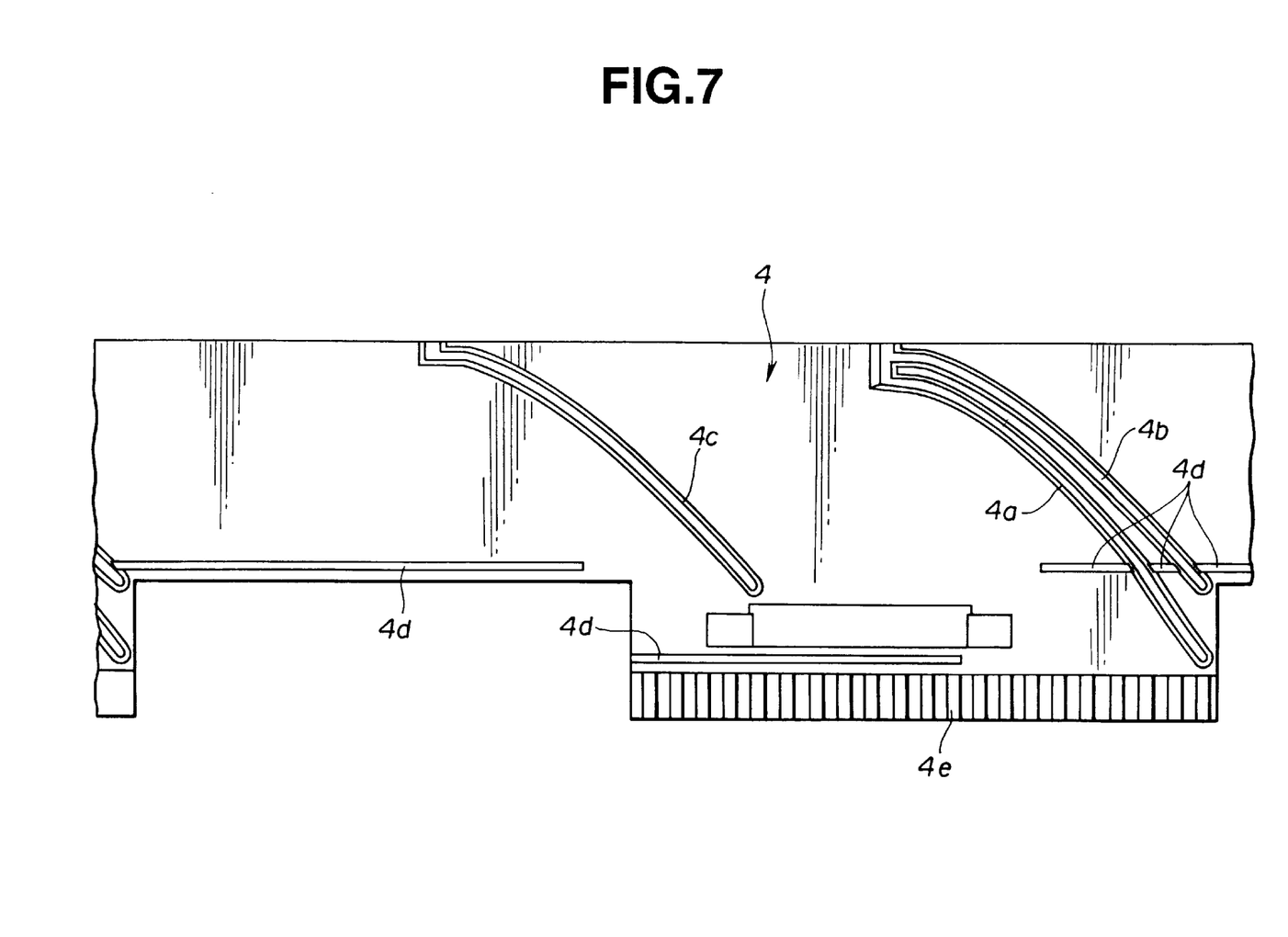
FIG. 7 is a development view, showing an inner cam ring when viewed from the side of an inner diameter thereof.
Figure 8:
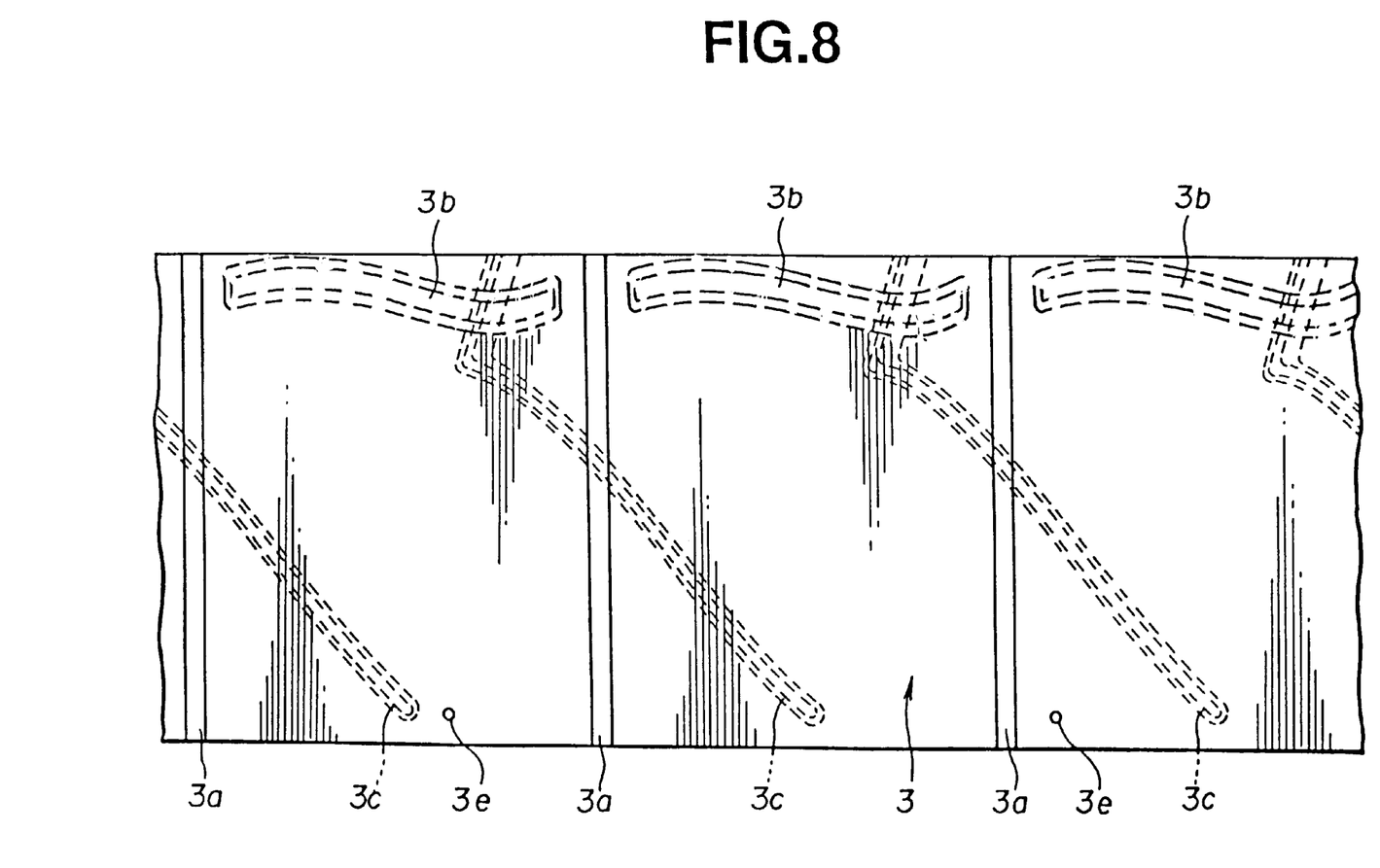
FIG. 8 is a development view, showing an outer cam ring when viewed from the side of an inner diameter thereof; and, FIG. 9 is a development view, showing a focus ring when viewed from the side of an inner diameter thereof.
Figure 9:
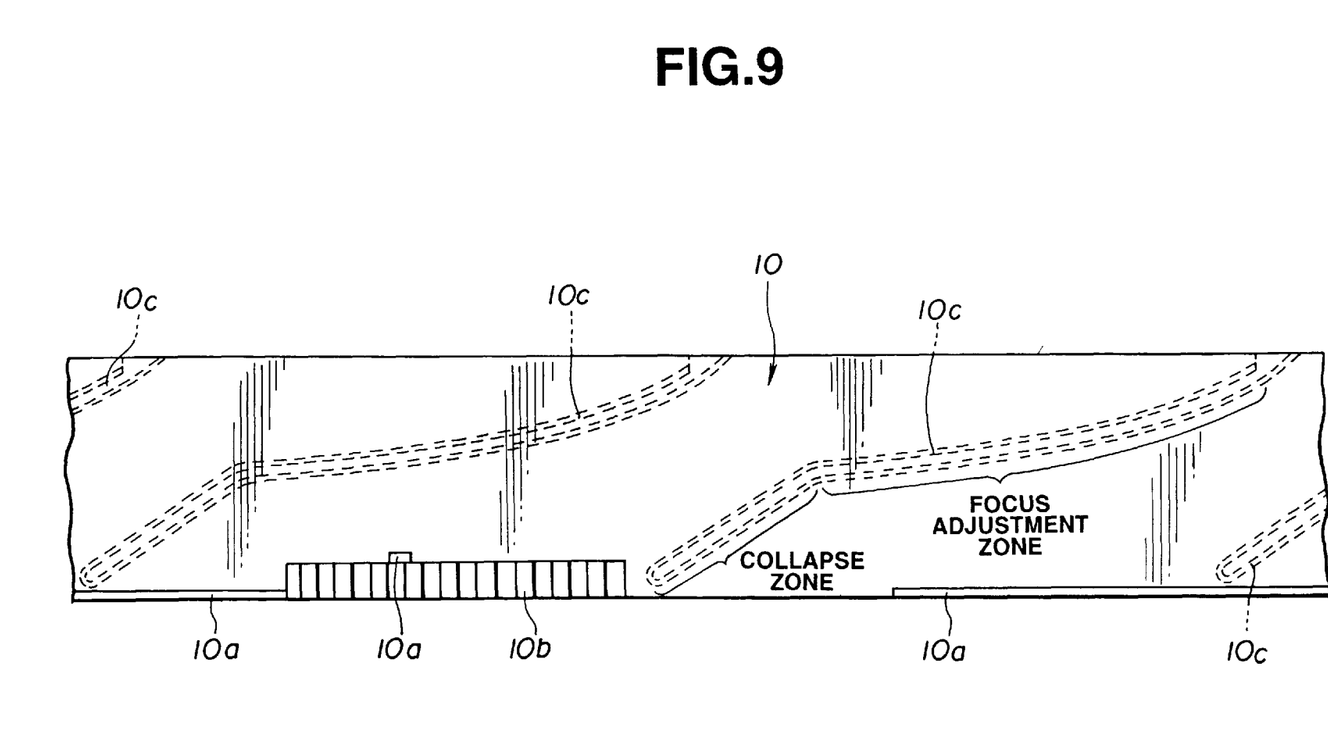

FIG. 2 is a cross-sectional view taken along the optical axis, illustrating the lens barrel in a collapsed state thereof. FIG. 3 is a cross-sectional view taken along the optical axis, illustrating the lens barrel in a widened state thereof. FIG. 4 is a cross-sectional view taken along the optical axis, illustrating the lens barrel in a telescoped state thereof. FIG. 5 is an exploded, perspective view, illustrating a portion of the lens barrel. FIG. 6 is an exploded, perspective view, illustrating another portion of the lens barrel. FIG. 7 is a development view, showing an inner cam ring when viewed from the side of an inner diameter thereof. FIG. 8 is a development view, showing an outer cam ring when viewed from the side of an inner diameter thereof. FIG. 9 is a development view, showing a focus ring when viewed from the side of an inner diameter thereof.

The lens barrel includes a stationary tube or a stationary frame 2, a stationary lens frame 1, an inner cam ring 4, an outer can ring 3, focus ring 10, a first group frame 5 for retaining the first lens group 101, a second group frame 7 for retaining the second lens group 102, a third group frame 8 or a lens frame for retaining the third lens group 103, a fourth group frame 9 for retaining the fourth lens group 104, a focus-driving mechanism, a zoom-driving mechanism, and a movable flare diaphragm mechanism. These three mechanisms will be described hereinafter.

The stationary frame 2 is in diametrical engagement with the focus ring 10 and the inner cam ring 4 in a state of the outer periphery of the stationary frame 2 being snugly fitted thereto. The focus ring 10 is sandwiched between the stationary frame 2 and the stationary lens frame 1 by these frames being bound together by means of machine screws 200. As a result, the focus ring 10 is prevented from moving in the direction of the optical axis, while being retained so as to be pivotable relative to the stationary frame 2. The stationary frame 2 has a gear lid 31 mounted thereon by means of machine screws 206. The gear lid 31 is formed with a claw 31a. In addition, the stationary frame 2 has claws 2a formed thereon at two locations. As a consequence, these three claws restrain a position of the inner cam ring 4 in the direction of the optical axis, while retaining the inner cam ring 4 in a state of being pivotable relative to the stationary frame 2 as well. As described hereinafter, the stationary frame 2 further has the following fixed thereto: the focus-driving mechanism; the zoom control mechanism; and, the movable flare diaphragm mechanism.

The stationary lens frame 1 is restricted in position by means of a positioning pin (not shown) of a camera body (not shown). In this state, this lens frame 1 remains secured to the camera body together with a member 50 by means of machine screws 201. In addition, the stationary lens frame 1 has the stationary frame 2 fastened thereto by the machine screws 200 in a state of the stationary frame 2 being restrained in position with respect to the stationary lens frame 1 by means of the positioning pin. The stationary lens frame 1 is impressed with linearly extending keyways 1a on the inner periphery thereof for restricting the first group frame 5 against rotation on the optical axis. At the same time, the stationary lens frame 1 is in diametrical engagement with the first group frame 5 in which the inner periphery of the former frame 1 is closely fitted to the latter frame 5 so as to be slidable in the direction of the optical axis. The stationary lens frame 1 has another member 62 fixed thereto by means of a machine screw, while a member 61 is mounted on the camera body.

As illustrated in FIG. 7, the inner cam ring 4 is impressed with the following on the inner periphery thereof: cam grooves 4b and 4c for moving the third group frame 8 in the direction of the optical axis; a cam groove 4a for moving the fourth group frame 9 in the direction of the optical axis; and, a circumferentially extending groove 4d for engagement with the claw 2a of the stationary frame 2. In addition, the inner cam ring 4 has an inner-toothed gear 4e formed on the inner periphery thereof at a rear end of the inner cam ring 4. The inner-toothed gear 4e is in threading engagement with a zoom driving gear 15. The inner cam ring 4 further has protrusions 4f formed on the outer periphery thereof at three locations at angular intervals of about 120 degrees. The inner cam ring 4 is in diametrically snug-fitting engagement with the outer cam ring 3 by the aid of snug-fitting diameters 4g of the protrusions 4f. In addition, linearly extending keys 4h of the protrusions 4f are closely fitted in the linearly extending keyways 3a of the outer can ring 3. In this way, the inner and outer cam rings 4 and 3 are connected together in union with one another in a rotational direction thereof and in a manner sidable in the direction of the optical axis.

As illustrated in FIG. 8, the outer cam ring 3 includes the following: the linearly extending keysways 3a on the inner periphery of the cam ring 3 at three locations, the keyways 3a being in the engagement with the keys 4h on the outer peripheral portion of the inner cam ring 4; and, convex cams 3b engaged with cam followers 7b of the second group frame 7 in order to move the second group frame 7 in the direction of the optical axis. The cam ring 3 further has cam grooves 3c defined on the outer periphery thereof at three locations so as to permit sliding pins 40 of the first group frame 5 to be sidably fitted in the cam grooves 3c. In addition, the outer cam ring 3 is diametrically closely fitted to an inner diameter of the first group frame 5. As a result, the first group frame 5 is moved in the direction of the optical axis. Further, the outer cam ring 3 has a peripheral flange portion 3d formed at a rear end thereof, whereby the cam ring 3 is in diametrically snug-fitting engagement with an inner diameter portion of the stationary lens frame 1. Yet further, the outer cam ring 3 has through-holes 3e punched at two locations, and further has pins 46 inserted therein. The pins 46 are closely fitted in cam grooves 10c of the focus ring 10.

Referring now to FIG. 9, the focus ring 10 is shown having the cam grooves 10c impressed on the outer circumference thereof for driving the outer cam ring 3 into movement in the direction of the optical axis at the time of both collapse and focus adjustment. Further, the focus ring 10 is diametrically engaged with the stationary frame 2 in which the inner periphery of the focus ring 10 is closely fitted to the latter 2 in an exclusively rotatable manner. In addition, the focus ring 10 is interposed between the stationary frame 2 and the stationary lens frame 1 by means of a protruding portion 10a that is provided on the inner periphery of the focus ring 10. In such a state, the focus ring 10 is restricted in position in the direction of the optical axis. Another restriction is placed on a rotatable angle of the focus ring 10. The focus ring 10 has an inner-toothed gear 10b formed on an inner peripheral surface thereof in a predetermined, circumferentially extending range. The inner-toothed gear 10b is in threading engagement with the idle gear 35 through the focus-driving gear train 108. As a result, rotational driving of the focus-driving motor 105 pivots the focus ring 10. The focus-driving motor 105 will be described hereinafter.

As previously mentioned, the first group frame 5 retains the first lens group 101. In further detail, the first group frame 5 includes the following: a first group-holding frame 6 for retaining the first lens group 101; and, a pressing ring 11 for retaining the first group-holding frame 6. The first group frame 5 further has cylindrical protruding portions 5a provided on the outer periphery thereof at a rear end of the frame 5. The protruding portions 5a are snugly fitted in the linearly extending keyways 1a on the inner periphery of the stationary lens frame 1. Further, the protruding portions 5a have through-holes 5b drilled therethrough, in which the sliding pins 40 for the first group frame 5 are inserted from the inner periphery of the first group frame 5 are inserted from the inner periphery of the first group frame 5. The first group frame 5 is in diametrical engagement with both of the second group frame 7 and the outer cam ring 3 in which the inner periphery of the first frame 5 is closely fitted thereto. Further, the first group frame 5 includes a linearly extending keyway 5c for locking the second group frame 7 against rotation. In addition, a friction plate 73 is affixed to the first group frame 5 on the inner periphery thereof for providing an adequate frictional force between the first group frame 5 and the outer cam ring 3. The friction plate 73 is made up of, e.g., a flat spring made of metal, a strip of flocked paper, or an elastic portion integrally formed on the first group frame 5.

As previously mentioned, the second group frame 7 retains the second lens group 102. This group frame 7 is in diametrical engagement with the first group frame 5 in which the outer periphery of the former frame 7 is snugly fitted to the inner periphery of the latter frame 5. The second group frame 7 has a protruding portion 7a extending outwardly from an outer peripheral portion thereof. The protruding portion 7a is closely fitted in the linearly extending keyway 5c on the inner periphery of the first group frame 5. The second group frame 7 further has a cam follower 7b provided on the outer periphery thereof at the same angular position as that of the protruding portion 7a. The cam follower 7b is engaged with the cam 3b of the outer cam ring 3. Yet further, the second group frame 7 has the following fixed to the rear side of the frame 7 by adhesive: a rod 7c for slidably retaining the third group frame 8 in the direction of the optical axis; and, a rod 7d for locking the third group frame 8 against rotation. The rod 7c is inserted through a coiled spring 24.

As described above, the third group frame 8 retains the third lens group 103. This frame 8 has a stop or diaphragm unit 109 fastened thereto by means of machine screws 205. In addition, the frame 8 has a sleeve 8a fixed thereto. The sleeve 8a is snugly fitted to the rod 7c of the second group frame 7. The third group frame 8 further has cam followers 43 planted thereon at two locations in mirror image relationship with respect to one another for zooming operation. The respective cam followers 43 are snugly fitted in the cam grooves 4b and 4c of the inner cam ring 4. Yet further, the third group frame 8 has a hole 8b drilled therethrough, and the rod 7d of the second group frame 7 is closely fitted in the hole 8b for locking the second group frame 7 against rotation. A rod 8c is glued and fixed to the rear of the third group frame 8 for holding the fourth group frame 9. In addition, a guide member 27 for a flexible substrate 110 of the stop unit 109 is bound to the rear of the third group frame 8 by means of a machine screw 202. A linearly extending key 8d for locking the fourth group frame 9 from rotation is formed on the third group frame 8 at a position substantially opposing the rod 8c. The third group frame 8 is further provided with a protruding portion 8e which is an abutment portion to be in abutting contact with a flare diaphragm 12, i.e., a flare diaphragm member of the movable flare diaphragm mechanism. This mechanism will be described hereinafter.

As described above, the fourth group frame 9 retains the fourth lens group 104. This frame 9 has a sleeve 9a glued and fixed thereto for snug-fitting engagement with the rod 8c that is fixed to the third group frame 8. The fourth group frame 9 further has the protrusion 9b formed on the outer periphery thereof for engagement with the linearly extending key 8d of the third group frame 8. In addition, the fourth group frame 9 has a cam follower 44 planted thereon for zooming. The cam follower 44 is snugly fitted in the cam groove 4a of the inner cam ring 4.

The focus-driving mechanism includes the focus-driving motor 105 and the focus-driving gear train 108. The motor 105 is anchored to the stationary frame 2 by means of a machine screw 203. The gear train 108 is rotatably supported on the stationary frame 2. As previously mentioned, this gear train 108 is in mesh with the inner-toothed gear 10b of the focus ring 10 through the idle gear 36. In addition, a slitted vane 36 is in threading engagement with the gear train 108 at one end thereof in order to permit a photo-interrupter 106 to detect an amount of evolution of the focus ring 10.

The zoom-driving mechanism includes the zoom-driving mechanism includes the zoom-driving gear 15 and a slitted vane 18. The zoom-driving gear 15 transmits a zoom-driving force to the inner cam ring 4 from an unillustrated zoom-driving gear train of the camera body. The slitted vane 18 is connected from the zoom-driving gear 15 through speed-increasing gear trains 16 and 17. A photo-interrupter 107 detects a state of the slitted vane 18, thereby detecting a rotational angle of the inner cam ring 4. In this connection, the slitted vane 18 is pivotably mounted on the stationary frame 2 though a washer 19. In addition, the photo-interrupter 107 is connected to a flexible print board 28.

The movable flare diaphragm mechanism includes the following: the flare diaphragm 12; a supporting shaft 14 or a supporting member; and, an urging spring 13 or an urging means formed by a compression-coiled spring. These components are secured together by the steps of: inserting the supporting shaft 14 through the flare diaphragm 12, the urging spring 13, and the stationary frame 2 in a skewer-like fashion; and, then fitting an E-ring 204 into a rear end of the supporting shaft 14 at a narrow-abridging portion 14a thereof. A protruding portion 12a of the flare diaphragm 12 is in diametrically snug-fitting engagement with the supporting shaft 14. The protruding portion 12a is urged in a forward direction by the urging spring 13, and is thereby ready for movement to a position at which the protruding portion 12a is in abutting contact with a stepped front portion 14b of the supporting shaft 14. The stepped portion 14b is a restricting portion of the supporting shaft 14. Further, the protruding portions 12a and 12b of the flare diaphragm 12 are light tight to prevent light rays from being incident on the supporting shaft 14 and the urging spring 13. In addition, these protruding portions 12a and 12b are configured to come into abutting contact with the protruding portion 8e of the third group frame 8 at a predetermined zooming position. The protruding portion 8e is located at a position to prevent a change in posture which would otherwise result from the urging force of the urging spring 13. In other words, the protruding portion 8e is positioned adjacent to the cam follower 43.

Next, a description will be made about how the above-identified lens barrel behaves when changing from a collapsed state to a widened state.

When the focus-driving motor 105 is supplied with driving electric power, then the focus-driving gear train 108 is driven to pivot the focus ring 10 through the idle gear 35. When the focus ring 10 is turned in a direction that is counterclockwise as viewed from a photographic subject, then the outer cam ring 3 is moved in a forward direction of the optical axis (the left in FIGS. 2 and 3) because the pin 46 inserted in the cam ring 3 is snugly fitted to the cam groove 10c. At this time, the inner cam ring 4 is restricted from rotation by the zoom-driving mechanism. Simultaneously therewith, the first and second group frames 5 and 7 are moved in the forward direction of the optical axis as well. The first group frame 5 has the sliding pin 40 closely fitted to the cam groove 3c of the outer cam ring 3, whereas the second group frame 7 has the cam follower 7b thereon. When the pin 46 of the cam ring 3 reaches a focus adjustment zone from a collapse zone in the cam groove 10c on the focus ring 10 as illustrated in FIG. 9, the lens barrel is ready for photography (the widened state) as illustrated in FIG. 3. Further, since the friction plate 73 causes the outer cam ring 3 to experience a constrained degree of freedom with respect to the linearly sliding first group frame 5, the cam ring 3 is smoothly linearly driven without being brought into rotational operation, even if a backlash occurs between the inner cam ring 4 and the zoom-driving mechanism.

A further description will now be provided for zooming behavior of the lens barrel.

In the widened state as illustrated by FIG. 3, when a zoom-driving motor (not shown) for a camera body (not shown) is supplied with the driving electric power, then a zoom-driving gear train (not shown) is driven to pivot the inner cam ring 4. The inner cam ring 4 has the inner-toothed gear 4e meshed with the zoom-driving gear 15. Concurrently therewith, the outer cam ring 3 is pivoted in the same direction as well. The outer cam ring 3 has linearly extending keyways 3a engaged with the linearly extending keys 4h on the inner cam ring 4. When the inner cam ring 4 is rotated in a direction that is clockwise when viewed from a photographic subject, then the first, second, third, and fourth group frames 5, 7, 8, and 9 are all moved in the forward direction of the optical axis. As a result, these group frames are displaced in a telescoped state as shown by FIG. 4. At this time, the flare diaphragm 12 is urged in the forward direction of the optical axis by the urging spring 13, and is thus moved in the forward direction of the optical axis in response to movement of the third group frame 8 until reaching the stepped portion 14b of the supporting shaft 14. When the inner cam ring 4 is driven in a direction opposite to the above, these group frames are changed in position from the telescoped state to the widened state. Since the protruding portion 8e of the third group frame is positioned adjacent to the third group frame-retraining rod 7c and the cam follower 43, there is no possibility that the protruding portion 8e is deformed by the resilient force of the urging spring 13, or that the protruding portion 8e undergoes a change in posture because of malfunction and the like when experiencing movement. As a result, optical function is sustained.

Next, focusing behavior of the lens barrel will be described.

When the focus-driving motor 105 is supplied with driving electric power, the focus ring 10 is pivoted through the focus-driving gear train 108 and the idle gear 35. At this time, rotational behavior of the outer cam ring 3 about the optical axis is restricted by the friction plate 73 which is fixedly attached onto the inner periphery of the first group frame 5, and further by the zoom-driving mechanism through the inner cam ring 4, as is the case with a change from the collapsed state to the widened state. Consequently, the outer cam ring 3 is moved in the direction of the optical axis along the cam groove 10c on the focus ring 10. Concurrently therewith, the first and second group frames 5 and 7 are moved in the same direction as well, in which the frame 5 has the sliding pin 40 engaged with the cams 3b and 3c of the outer cam ring 3, whereas the frame 7 has the cam follower 7b thereon.

Although the third group frame 8 is moved in the direction of the optical axis during zooming operation according to the above-described embodiment, this group frame 8 may be moved at the time of focusing operation, with consequential movement of the flare diaphragm member in accordance with a subject distance.

In lens barrels employing a conventional cam driving system, there has been a need for a space to extend a cam ring or a space to be connected to the cam ring. In contrast, the lens barrel according to the present embodiment as mentioned above obviates such a requirement. As a result, the lens barrel can be structured in a smaller space. Furthermore, it is possible to provide a halt position of the flare diaphragm at the most effective position, which would otherwise be difficult to achieve for conventional structures having the flare diaphragm moved jointly with moving frames. As a result, harmful light rays can be cut off efficiently.

In this invention, it is apparent that working modes different in a wide range can be formed on this basis of this invention without departing from the spirit and scope of the invention. This invention is not restricted by any specific embodiment except as may be limited by the appended claims.

What is claimed is:

1. A lens barrel, comprising:

a flare diaphragm member for intercepting harmful light rays among incident light rays;

a protruding portion provided on said flare diaphragm member, said protruding portion having a guide portion;

a supporting shaft making a snug fit in said guide portion of said protruding portion, said supporting shaft guiding said flare diaphragm member in a manner movable along a direction of an optical axis;

a frame member movable along the direction of the optical axis for back-and-forth movement; and an abutment portion provided on said frame member, said abutment portion being movable to make abutting contact with said flare diaphragm member;

wherein said flare diaphragm member is moved along the direction of the optical axis in response to the movement of said frame member along the direction of the optical axis, while said flare diaphragm member is held in abutment with said abutment portion of said frame member.

2. A lens barrel, comprising:

a flare diaphragm member for intercepting harmful light rays among incident light rays;

a first frame member;

a second frame member relatively movable with respect to said first frame member along a direction of an optical axis for back-and-forth movement;

a guide means for supporting said flare diaphragm member in a manner relatively movable with respect to said first frame member along the direction of the optical axis;

an abutment portion provided on said second frame member, said abutment portion being movable to make abutting contact with said flare diaphragm member; and an urging means for urging said flare diaphragm member along the direction of the optical axis in a direction in which said flare diaphragm member is driven into contact with said abutment portion of said second frame member, wherein said flare diaphragm member is moved along the direction of the optical axis relative to said first frame member in response to relative movement of said second frame member with respect to said first frame member along the direction of the optical axis, while said flare diaphragm member is held in abutment with said abutment portion of said second frame member.

3. A lens barrel as defined in claim 2, wherein said flare diaphragm member is moved to an abutted state position in response to movement of said second frame member in the direction of the optical axis, at which position said flare diaphragm member is in abutting contact with said second frame member to move in union with said second frame member in the direction of the optical axis, and wherein said flare diaphragm member is further moved to a captivated state position when said flare diaphragm member is released from abutting contact with said second frame member by further movement of said second frame member, at which position said flare diaphragm member is captivatively held at a maximum movement position in the direction of said second frame member by means of a stopper portion, said stopper portion being provided on said guide means.

4. A lens barrel as defined in claim 2, wherein said urging means is a coiled spring disposed between said flare diaphragm member and said first frame member.

5. A lens barrel as defined in claim 2, wherein said abutment portion of said second frame member is provided adjacent to one of a supporting shaft and a cam follower, in which said supporting shaft supports said second frame member in a manner movable in the direction of the optical axis, and which said cam follower brings said second frame member into movement in the direction of the optical axis.

6. A lens barrel as defined in claim 2, wherein said first frame member is a stationary tube fixed in relation to a body of said lens barrel, and wherein said second frame member is a moving member for executing one of focal length change (zooming) and focus adjustment (focusing) by way of movement of said second frame member in the direction of the optical axis.

7. A lens barrel as defined in claim 2, wherein said guide means comprises a guide aperture and a guide shaft, in which said guide aperture is provided in one of said flare diaphragm member and said second frame member, whereas said guide shaft is provided on another of said flare diaphragm member and said second frame member, said guide shaft extending in the direction of the optical axis and making a snug fit in said guide aperture and being sidable relative to said guide aperture.

8. A lens barrel as defined in claim 7, wherein said flare diaphragm member comprises a light tight portion for isolating said guide shaft from incident light rays.

9. A lens barrel as defined in claim 7, wherein said urging means is a compression-coiled spring disposed in a coaxial relationship with said guide shaft.

10. A lens barrel as defined in claim 9, wherein said flare diaphragm member comprises a light tight portion for isolating said compression-coiled spring from incident light rays.

11. A lens barrel for use in a camera having a photographic optical system, comprising:

a diaphragm member positioned at a rear end of said optical system;

an urging member for urging said diaphragm member in a direction of said optical system; and, a retaining frame for retaining an optical element of said optical system, said retaining frame being movable in a direction of an optical axis of said optical element, wherein said diaphragm member and said retaining frame are moved away from one another upon movement of said retaining frame in one direction of said optical axis, while said urging member urges said diaphragm member toward said retaining frame, and wherein said diaphragm member and said retaining frame are brought into abutting contact with one another upon movement of said retaining frame in the other direction of the optical axis, in which state said retaining frame resists said urging member and moves said diaphragm member in a direction in which said retaining frame is advanced.

12. A lens barrel as defined in claim 11, wherein said photographic optical system is an optical system whose focal distance is changeable.

13. A lens barrel as defined in claim 11, wherein said photographic optical system is moved along the optical axis in order to change a focal distance and provide collapse behavior.

14. A lens barrel, comprising:

a first frame fixed at a first mounting end;

a guide shaft fixed at a second mounting end adjacent to the mounting end of said fixed first frame;

a flare diaphragm for preventing flare positioned in said fixed first frame, said flare diaphragm having an integral guide projection for sidably engaging said guide shaft which guides said flare diaphragm along a path parallel to an optical axis of said lens barrel;

a second frame movable relative to said fixed first frame for moving a lens;

said second frame having an engaging portion aligned with a portion of said flare diaphragm;

bias means urging said diaphragm in a direction along the optical axis away from said first mounting end and toward engagement with said second frame engaging portion to move the flare diaphragm with movement of the second frame away from said first mounting end; and said guide shaft having a limiting spaced from said first mounting end portion limiting movement of the flare diaphragm when engaged by said guide projection.

15. A lens barrel according to claim 14 wherein said guide projection has a shoulder for engaging said shaft limiting portion to prevent further movement in a direction away from said mounting end.

16. A lens barrel according to claim 14 further comprising guide means for guiding movement of the second frame along a linear path, said guide means being positioned adjacent to said frame engaging portion.

* * * * *